United States Patent [19]
Carter et al.

[11] 3,923,421
[45] Dec. 2, 1975

[54] LIGHTNING PROTECTED COMPOSITE HELICOPTER BLADE

[75] Inventors: Donald Richard Carter, Derby; Gerald Walter Parkinson, West Haven; Jack Robert Cutting, Trumbull, all of Conn.

[73] Assignee: United Technologies Corporation, Hartford, Conn.

[22] Filed: Dec. 19, 1974

[21] Appl. No.: 534,407

[52] U.S. Cl. .............. 416/224; 416/146; 416/226; 416/241 A; 244/1 A
[51] Int. Cl.² .......................................... B63H 1/26
[58] Field of Search ....... 416/146, 226, 241 A, 224; 244/1 A

[56] References Cited
UNITED STATES PATENTS

| | | | |
|---|---|---|---|
| 2,580,363 | 12/1951 | Schmitt | 416/226 |
| 3,103,977 | 9/1963 | Negromi | 416/241 A |
| 3,498,572 | 3/1970 | Lumn | 244/1 A |
| 3,755,713 | 8/1973 | Paszkowski | 244/1 A |

OTHER PUBLICATIONS

Aviation Week & Space Technology, Aug. 29, 1966, Vol. 85, No. 9, pp. 40, 41, 43, 46.
Stahmann & Hackenberger, Lightning Protection for Non-Metallic Rotor Blades, Dec. 9., 1970.

*Primary Examiner*—Harold W. Weakley
*Attorney, Agent, or Firm*—Vernon F. Hauschild

[57] ABSTRACT

A composite helicopter blade made of electrically conductive and electrically nonconductive materials in which the blade parts most susceptible to being struck by lightning are either insulated from the lightning or are grounded to the blade root and hence to the fuselage.

13 Claims, 5 Drawing Figures

U.S. Patent    Dec. 2, 1975    3,923,421
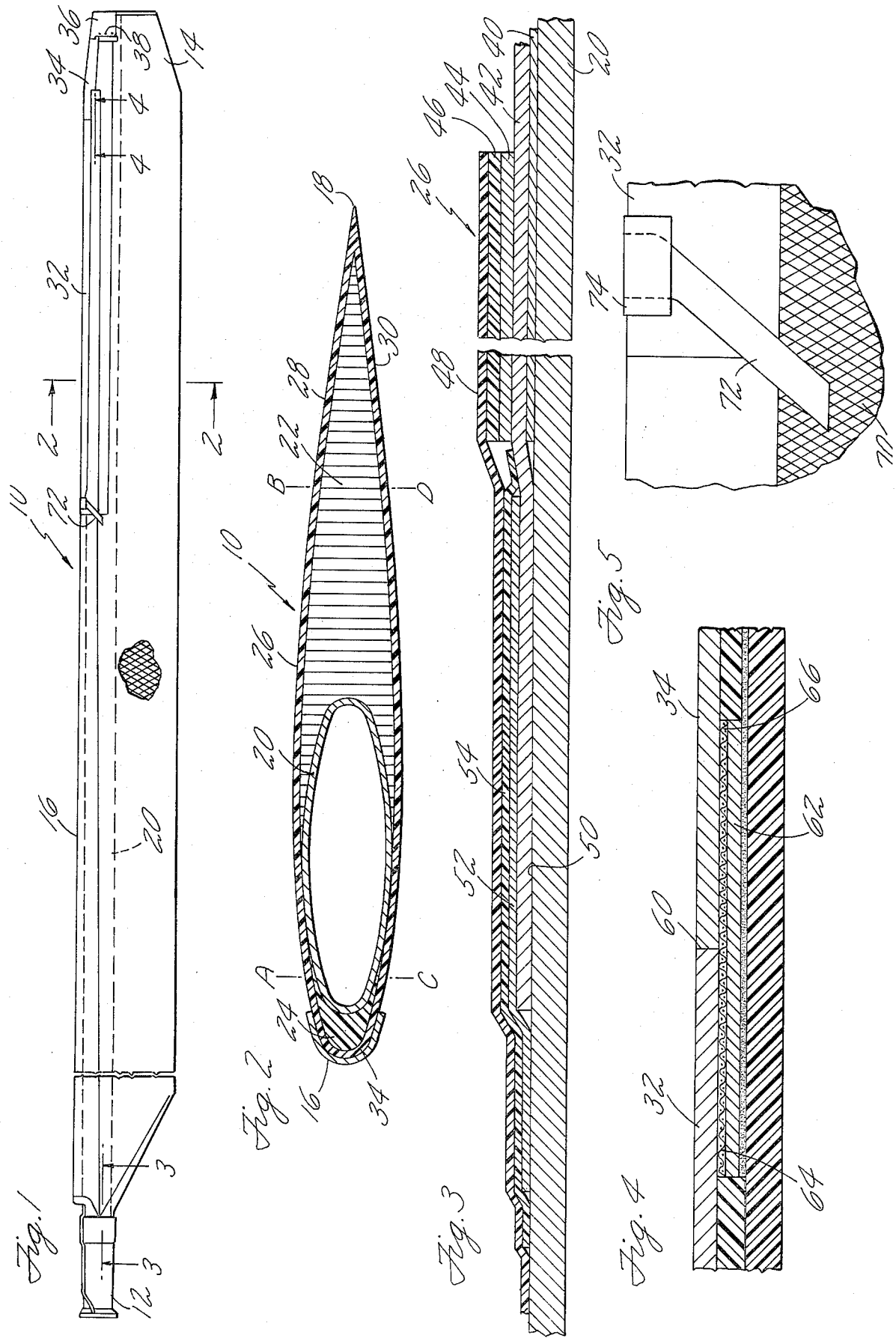

ial spar 20 which is either connected to for
LIGHTNING PROTECTED COMPOSITE HELICOPTER BLADE

BACKGROUND OF THE INVENTION

1. Field of the Invention

This invention relates to composite helicopter blades and more particularly to such blades having the capability of withstanding being struck by lightning.

2. Description of the Prior Art

While lightning arresting mechanism has been used on aircraft in the past, it has not been suitable for use with composite helicopter blades which have peculiar susceptibility to damage due to lightning strike.

SUMMARY OF INVENTION

A primary object of the present invention is to provide a composite helicopter blade in which the parts most susceptible to being struck by lightning are isolated by insulation or are grounded to the helicopter to permit the blade to remain intact if struck by lightning so that the helicopter may land safely.

In accordance with the present invention, all parts of the helicopter blade susceptible of being struck by lightning are grounded to the helicopter through the blade root, or isolated by insulation such that lightning finds a more desirable grounding path.

In accordance with a further aspect of the present invention, the composite helicopter blade is fabricated so as to deny the impinging lightning arc the potential required to pierce the fiber glass portions of the blade.

In accordance with this invention, the upper and lower surfaces of the blade are grounded to the helicopter by imbedding a light, thin, electrically conductive material which is sufficiently flexible so as to be easily bonded to the blade surface and which is able to transfer high currents with only slight damage to itself, for example, aluminum wire fabric in the form of a woven screen.

The invention prevents the lightning from blowing-off the blade leading edge anti-abrasion strips, delaminating the fiber glass skin, and making holes or pits in the blade structural spar from which cracks may propagate.

Other objects and advantages of the present invention may be seen by referring to the following description and claims, read in conjunction with the accompanying drawings.

BRIEF DESCRIPTION OF THE DRAWINGS

FIG. 1 is a top view of a composite helicopter blade using this invention.

FIG. 2 is a cross-sectional view of the blade taken along line 2—2 of FIG. 1.

FIG. 3 is a view taken along line 3—3 of FIG. 1.

FIG. 4 is a view taken along line 4—4 of FIG. 1.

FIG. 5 is an enlarged showing of a portion of FIG. 1 to illustrate the electrical connection between the blade leading edge anti-abrasion strips and the aluminum mesh in the blade surface.

DESCRIPTION OF THE PREFERRED EMBODIMENT

Referring to FIG. 1 we see composite helicopter blade 10, which comprises blade root 12, tip 14, leading edge 16, trailing edge 18, which is airfoil shape in cross section as best shown in FIG. 2, and which is adapted to be connected to a helicopter rotor head in conventional fashion for rotation therewith with one or more additional blades to serve either as the lift or tail rotor of the helicopter.

The principal load carrying member of the blade is structural spar 20 which is either connected to for forms blade root 12 and extends therefrom for substantially the full blade span to the blade tip 14. Spar 20 is preferably hollow in construction, of elliptical shape, and made of metallic construction preferably annealed titanium. Spar 20, as best shown in FIG. 2, is shaped to cooperate with trailing edge core 22, and possible leading edge core 24 and skin assembly 26 to define the airfoil cross-sectional shape of blade 10. Cores 22 and 24 may be made of any lightweight material, such as honeycomb foam or polyethylene while skin assembly 26 is fabricated of a plurality of layers of resin-impregnated fiber glass bonded together and to the spar and cores. Skin member 26 defines blade top surface 28 and bottom surface 30. In view of the fact that the leading edge 16 of blade 10 is susceptible to abrasion during operation, anti-abrasion strips, such as inner strip 32 and outer strip 34 are bonded to the exterior of skin assembly 26 at the blade leading edge as shown in FIG. 1. In addition, tip cap 36 covers blade tip 14 and is threadably connected to spar 20 by a plurality of bolt or screw members 38.

FIG. 3 shows the construction of the connection between spar 20 and skin assembly 26 in greater particularity. It will be noted that blanket assembly 40 is bonded to spar 20 and performs the function of creating an external passage for release of spar internal pressure to atmosphere thereby reflecting a possible faulty spar 20 as more fully described in U.S. Pat. No. 3,765,124. Skin assembly 42 covers and is bonded to blanket assembly 40 and comprises one or more layers of bonded fiber glass with a layer of electrically conductive woven screen 70 bonded to the outer surface thereof. This woven screen 70 extends substantially the full distance between the blade root and the blade tip in both the top surface 28 and the bottom surface 30 of the blade and extends between chord stations A and B in top surface 28 and chord stations C and D in bottom surface 30, so as to cover partially the area of top and bottom surfaces 28 and 30 of blade 10. This woven screen is preferably made of aluminum wire fabric of plain square weave, 200 mesh/inch, 0.02 pounds per square foot and 0.004 inch thick. As best shown in FIG. 3, fairing 44 envelops skin assembly 42 and is preferably made of fiber glass, while multiple wrap member 46 envelops fairing 44, and multiwrap sleeve 48 envelops wrap member 46. Members 46 and 48 are preferably made of fiber glass. Still viewing FIG. 3, it will be noted that at its root end, skin assembly 42 comes into direct contact along surface 50 with spar 20. To insure electrical contact between the woven mesh 70 of skin assembly 42 and spar 20, one or more thicknesses of electrically conductive woven mesh 52 are wrapped chordwise around skin assembly 42 so as to overlap both the wire mesh portion 70 of skin assembly 42 and the spar 20. Preferably, wrap 52 is one thickness of aluminum mesh wrapped chordwise around spar 20 and skin assembly 42 with its ends butted. Two to three wraps of shrink tape, such as mylar shrink tape, are wrapped around aluminum mesh wrap 52 and extends spanwise there beyond to sealably engage the outer surface of skin assembly 42 and the outer surface of spar 20 so as to seal the aluminum mesh of wrap 52. A multiple wrap member 48 then envelops members 46, tape 54, and spar 20 as shown. By viewing FIG. 3 it will be seen that aluminum mesh wrap 52 is an electrical contact with both the outer mesh surface 70 of skin assembly 42 and spar 20 so as to establish electrical contact therebetween.

Viewing FIG. 4 we see that outer anti-abrasion strip 34 and inner anti-abrasion strip 32 abut along surface 60. The two strips are electrically connected as shown in FIG. 4. A grounding strip 62, which is made of electrically conductive material such as aluminum, titanium or stainless steel, overlaps strips 32 and 34 on opposite sides of abutting surface 60. Strips 32 and 34 are preferably electro-formed nickel anti-abrasion strips. Wire mesh members 64 and 66, which are preferably wire mesh, possibly monel, with a loop type weave woven into a stocking, possibly 13 stitches per inch, extend in cushion fashion between grounding strips 62 and anti-abrasion strips 32 and 34 to provide an electrical connection therebetween. Stocking mesh strips 64 and 66 are selected because they have the advantage of resiliency to maintain spring pressure for electrical contacts. If preferred, strips 64 and 66 could be continuous.

Viewing FIG. 5, we see that the inboard end of anti-abrasion strip 32 is connected to surface mesh member 70 by an electrically conductive strip 72, which is preferably thin aluminum foil bonded with conductive adhesive to both mesh 70 and strip 32 along either the top surface 28 or bottom surface 30 of blade 10, or both. Preferably, rubber cap member 74 slips over the leading edge of strip 72 to protect it from abrasion.

With the composite blade construction just described, all parts of the blade, and in particular those susceptible to lightning strike, will be isolated by insulation or grounded to the blade root, which connects to the helicopter rotor and hence the helicopter fuselage. Tip cap 36 is connected directly to electrically conductive spar 20 by electrically conductive bolts 38 and is therefore directly grounded to the root 12 through the spar 20. Outer anti-abrasion strip 34 is electrically connected to inner anti-abrasion strip 32 through conductive strip 62 and stocking members 64 and 66, while inner strip 32 is electrically connected to mesh member 70 of skin upper and/or lower surfaces 28 and 30 through conductive connecting member 72. Mesh members 70 of upper and lower blade surfaces 28 and 30 are electrically connected to spar 20 through wrap member 52 as shown in FIG. 3. Experience has shown that a lightning strike on any portion of surfaces 28 and 30 not covered by mesh 70 will travel to the mesh and will be grounded therethrough as just described without penetrating non-conductive parts. Mesh 70 does not extend for the full blade chord for weight saving purposes.

We wish it to be understood that we do not desire to be limited to the exact details of construction shown and described, for obvious modifications will occur to a person skilled in the art.

We claim:

1. A composite helicopter blade having a tip, a leading edge, a trailing edge, and a top surface, a bottom surface, and
   A. a blade root adapted to be electrically grounded to the helicopter,
   B. an electrically conductive support spar electrically connected to or forming the blade root and extending to the blade tip,
   C. a non-conductive blade skin member enveloping the spar and shaped to define the blade airfoil between the leading and trailing edge and extending for substantially the full blade span,
   D. an electrically conductive outer leading edge anti-abrasion strip connected to the skin member at the blade leading edge at an outboard span station,
   E. an electrically conductive inner leading edge abrasion strip connected to the skin member at the blade leading edge at a span station inboard of the outer anti-abrasion strip,
   F. a blade tip cap enveloping the blade tip,
   G. lightning grounding mechanism including;
      1. means electrically connecting the blade tip cap to the spar,
      2. means electrically connecting said anti-abrasion strips,
      3. a light, flexible, electrically conductive member attached to the top or bottom surface of the blade and extending substantially from the blade root to the blade tip,
      4. means electrically connecting said leading edge anti-abrasion strips to said flexible member, and
      5. means for electrically connecting the root end of the flexible member to the spar.

2. A blade according to claim 1 wherein said tip cap is fabricated of an electrically conductive material and including means grounding said tip cap to said spar.

3. A blade according to claim 2 wherein said grounding means is a threaded connection.

4. A blade according to claim 3 wherein said flexible member is fabricated of aluminum wire fabric.

5. A blade according to claim 4 wherein said skin member is fabricated of a plurality of layers of bonded fiber glass.

6. A blade according to claim 5 wherein said anti-abrasion strip connecting means include an electrically conductive grounding strip extending in overlapping relationship between the anti-abrasion strips and a conductive wire mesh member extending between the grounding strip and each anti-abrasion strip.

7. A blade according to claim 6 wherein said anti-abrasion strips abut.

8. A blade according to claim 7 wherein said wire mesh member is metal wire mesh.

9. A blade according to claim 8 wherein said means connecting said anti-abrasion strips to said spar comprise at least one aluminum foil member extending therebetween and electrically connected to each.

10. A blade according to claim 9 wherein said flexible member-to-spar connecting means comprises a light, flexible, electrically conductive member wrapped about the periphery of the blade in the direction of the blade chord and positioned along the blade span so as to overlap and electrically contact both the spar and the blade surface flexible member.

11. A blade according to claim 10 and including non-conductive and waterproof shrink tape wound around said chordwise extending flexible wrap member to force the wrap member against both the spar and the blade surface flexible member.

12. A blade according to claim 10 wherein said flexible wrap member is fabricated of aluminum wire fabric.

13. A composite helicopter blade having a tip, a leading edge, a trailing edge, and a top surface, a bottom surface, and
- A. a blade root adapted to be electrically grounded to the helicopter,
- B. an electrically conductive support spar electrically connected to or forming the blade root and extending to the blade tip,
- C. a non-conductive blade skin member enveloping the spar and shaped to define the blade airfoil between the leading and trailing edge and extending for substantially the full blade span,
- D. at least one electrically conductive outer leading edge anti-abrasion strip connected to the skin member at the blade leading edge at an outboard span station,
- E. a blade tip cap enveloping the blade tip,
- F. lightning grounding mechanism including:
  1. means electrically connecting the blade tip cap to the spar,
  2. a light, flexible, electrically conductive member attached to the top or bottom surface of the blade and extending substantially from the blade root to the blade tip,
  3. means electrically connecting said leading edge anti-abrasion strip to said flexible member, and
  4. means for electrically connecting the root end of the flexible member to the spar.

* * * * *